United States Patent
Lavedrine et al.

(10) Patent No.: US 11,165,768 B2
(45) Date of Patent: Nov. 2, 2021

(54) TECHNIQUE FOR CONNECTING TO A SERVICE

(71) Applicant: Orange, Issy-les-Moulineaux (FR)

(72) Inventors: Remi Lavedrine, Siant-Mande (FR); Franck Weens, Meudon (FR); Patrick Sachet, Clamart (FR)

(73) Assignee: ORANGE, Issy-les-Moulineaux (FR)

( * ) Notice: Subject to any disclaimer, the term of this patent is extended or adjusted under 35 U.S.C. 154(b) by 160 days.

(21) Appl. No.: 15/550,972

(22) PCT Filed: Feb. 2, 2016

(86) PCT No.: PCT/FR2016/050210
§ 371 (c)(1),
(2) Date: Aug. 14, 2017

(87) PCT Pub. No.: WO2016/128645
PCT Pub. Date: Aug. 18, 2016

(65) Prior Publication Data
US 2018/0034809 A1    Feb. 1, 2018

(30) Foreign Application Priority Data
Feb. 13, 2015 (FR) .................................... 1551230

(51) Int. Cl.
*H04L 29/06* (2006.01)

(52) U.S. Cl.
CPC ...... *H04L 63/0838* (2013.01); *H04L 63/0807* (2013.01); *H04L 63/0815* (2013.01); *H04L 63/0853* (2013.01); *H04L 63/102* (2013.01)

(58) Field of Classification Search
CPC .................................................. H04L 63/0838
(Continued)

(56) References Cited

U.S. PATENT DOCUMENTS 8,225,383 B1 * 7/2012 Channakeshava .... H04L 63/083
726/7
8,302,187 B1 * 10/2012 Gupta ................. H04L 65/1079
726/22

(Continued)

FOREIGN PATENT DOCUMENTS

FR   2839832 A1   11/2003
WO   03007571 A1   1/2003

OTHER PUBLICATIONS

English translation of the Written Opinion of the International Searching Authority dated Jul. 4, 2017, for corresponding International Application No. PCT/FR2016/050210, filed Feb. 2, 2016.

(Continued)

*Primary Examiner* — Dant B Shaifer Harriman
(74) *Attorney, Agent, or Firm* — David D. Brush; Westman, Champlin & Koehler, P.A.

(57) ABSTRACT

A technique for connecting a user device to a service. The device sends a request to connect to the service, a user identifier of the device from a trusted entity being associated with the request. The trusted entity sends a reply to the request back to the device. This reply includes data about a uniform resource locator associated with the service and a single-use code and is sent to a contact address associated with the user identifier from the trusted entity. The device then sends a request to access a page of the service, the address of which corresponds to the data, the received single-use code being associated with the access request. Connection to the service is authorized for the service identifier associated with the user identifier from the trusted entity, when a single-use code received from a server implementing the service, in combination with a service identifier request, is valid.

8 Claims, 3 Drawing Sheets

(58) Field of Classification Search
USPC .............................................................. 726/7
See application file for complete search history.

(56) References Cited

U.S. PATENT DOCUMENTS

| | | | | |
|---|---|---|---|---|
| 2004/0186768 | A1* | 9/2004 | Wakim | G06F 16/955 |
| | | | | 705/14.27 |
| 2009/0165098 | A1* | 6/2009 | Ifrah | G06Q 10/10 |
| | | | | 726/5 |
| 2010/0263029 | A1* | 10/2010 | Tohmo | H04L 9/0863 |
| | | | | 726/6 |
| 2011/0030043 | A1 | 2/2011 | Jones et al. | |
| 2011/0088087 | A1* | 4/2011 | Kalbratt | G06Q 20/02 |
| | | | | 726/7 |
| 2012/0233678 | A1* | 9/2012 | Pal | H04L 63/0838 |
| | | | | 726/7 |

OTHER PUBLICATIONS

International Search Report dated Apr. 18, 2016 for corresponding International Application No. PCT/FR2016/050210, filed Feb. 2, 2016.

Written Opinion of the International Searching Authority dated Apr. 18, 2016 for corresponding International Application No. PCT/FR2016/050210, filed Feb. 2, 2016.

* cited by examiner

TECHNIQUE FOR CONNECTING TO A SERVICE

CROSS-REFERENCE TO RELATED APPLICATIONS

This application is a Section 371 National Stage Application of International Application No. PCT/FR2016/050210, filed Feb. 2, 2016, the content of which is incorporated herein by reference in its entirety, and published as WO 2016/128645 on Aug. 18, 2016, not in English.

FIELD OF THE DISCLOSURE

The invention relates to the general field of telecommunications.

The invention more particularly concerns a technique for connecting to a service of a user device.

BACKGROUND OF THE DISCLOSURE

To connect to a service, a user generally needs to provide a connection identifier, comprising a user identifier and a password. The connection identifier allows the administrator of a service to manage the access rights of a user associated with this identifier for this service. Such a service can correspond to a social network service, to a payment service or to an online sales service, for example.

This type of connection requires the user to remember a connection identifier and especially a password for each service. It is found that the user often chooses an identical password for accessing a plurality of services. This decreases the security level associated with a password connection. When the user chooses a separate password for each service, it then becomes complicated for him to remember the plurality of passwords. He may then note them down on a piece of paper, in a file or even use a password management application, in order to find them. He may even request a new password when he wishes to connect. It is thus understandable that, for the user, connection using a password introduces a level of complexity for connecting to a service and/or gives rise to security problems.

SUMMARY

According to a first aspect, the subject of the invention is a method for connection to a service of a user device, said method comprising:
  sending, by the device, of a request for connection to said service, an identifier of a user of the device at a trusted entity being associated with said request;
  reception, by said device, from a trusted entity, of a response to said request, said response comprising a datum relating to a uniform resource locator associated with said service and a single-use connection code;
  sending, by said device, of a request for access to a page of the service whose address corresponds to said datum, the received connection code being associated with said access request;
  connection to said service for a service identifier associated with the user identifier at the trusted entity, following validation of the connection code by the trusted entity.

Correlatively, the method for connection to a service comprises, for a user device:
  reception, by a trusted entity, from the device, of a request for connection to said service, an identifier of a user of the device at the trusted entity being associated with said request;
  sending, to the device, by the trusted entity, of a response to said request, said response comprising a datum relating to a uniform resource locator associated with said service and a single-use connection code;
  authorization of connection to said service for the service identifier associated with the user identifier at the trusted entity, when a connection code received, by the trusted entity, from a server implementing the service, in association with a service identifier request, is valid.

The trusted entity thus generates a connection code for a user and for a service. This connection code thus allows the trusted entity to uniquely identify the user and the requested service. The user subsequently only has to request access to a page of the service by clicking on a datum relating to a uniform resource locator. The datum relating to a uniform resource locator corresponds to a URL (for "Uniform Resource Locator"), which is coded in the form of a URL scheme. A URL is a character string combining information necessary for indicating to a piece of software how to access an Internet resource. The trusted entity then uses the connection code to determine the service identifier for the requested service associated with the user identifier. The customer route is highly simplified and secure. The user does not have to remember multiple service identifiers and passwords.

The user identifier corresponds, by way of example, to an identification number in a mobile or fixed network or to an electronic mail address.

The response is, by way of example, sent by means of a short message or else an electronic mail.

The various embodiments or implementation features mentioned below can be added independently or in combination with one another to the steps of the connection method as defined above.

According to one particular feature of the connection method, the response to the connection request is sent to a contact address associated with the user identifier at the trusted entity.

In the event of fraudulent use of the contact address by a third party, the user can then take action at his network or messaging operator in order to invalidate this contact address.

By way of example, when the user device is a mobile terminal, the report made to his operator allows sending of the response to be blocked if a connection to the service is attempted.

In one particular embodiment of the connection method, the contact address is a telephone number allowing a user of the device to be reached.

In this embodiment, the user device is, by way of example, a mobile terminal executing an application.

In one particular embodiment of the connection method, the contact address is an electronic mail address associated with the user of the device.

In this embodiment, the user device is, by way of example, a portable computer browsing a website.

According to a second aspect, the invention also concerns a user device comprising:
  a contact module, designed to receive, from a trusted entity, a response to a request for connection to a service, the response comprising a datum relating to a uniform resource locator associated with said service and a single-use connection code and being sent to a contact address associated with the user identifier at the trusted entity;

a connection module, designed to:

send a request for connection to a service, an identifier of a user of the device at a trusted entity being associated with said request;

following reception of the response by the contact module, send a request for access to a page of the service whose address corresponds to the datum included in the response, the connection code received in the response being associated with said access request;

connect to the service for a service identifier associated with the user identifier at the trusted entity, following validation of the connection code by the trusted entity.

This user device may of course have the various features relating to the connection method as described above, which can be combined or taken in isolation. Thus, the advantages set out for the connection method according to the first aspect are directly applicable to the user device. Therefore, they are not itemized in more detail.

According to a third aspect, the invention also concerns a trusted entity, designed to authorize connection of a user device to a service. This trusted entity comprises:

a determination module for determining a response to a request for connection to a service, an identifier of a user of the device at the trusted entity being associated with said request, said response comprising a datum relating to a uniform resource locator associated with said service and a single-use connection code and being sent to a contact address associated with the user identifier at the trusted entity;

a connection authorization module, designed to authorize a connection to said service for a service identifier for said service, associated with the user identifier, when a connection code received from the server implementing the service, in association with a service identifier request, is valid.

This trusted entity may of course have the various features relating to the connection method as described above, which can be combined or taken in isolation. Thus, the advantages set out for the connection method according to the first aspect are directly applicable to the trusted entity. Therefore, they are not itemized in more detail.

According to a fourth aspect, the invention concerns a program for a user device, comprising program code instructions intended to control the execution of those of the steps of the method for connection to a service described above that are implemented by the user device when this program is executed by this device and a recording medium readable by a device, on which a program for a device is recorded.

The advantages set out for the connection method according to the first aspect are directly applicable to the program for a user device and to the recording medium.

According to a fifth aspect, the invention concerns a program for a trusted entity, comprising program code instructions intended to control the execution of those of the steps of the method for connection to a service described above that are implemented by the trusted entity when this program is executed by this entity and a recording medium readable by a trusted entity, on which a program for an entity is recorded.

The advantages set out for the connection method according to the first aspect are directly applicable to the program for a trusted entity and to the recording medium.

BRIEF DESCRIPTION OF THE DRAWINGS

The technique for connecting to a service will be better understood with the aid of the following description of particular embodiments, with reference to the appended drawings, in which.

DETAILED DESCRIPTION OF ILLUSTRATIVE EMBODIMENTS

Figure 1:
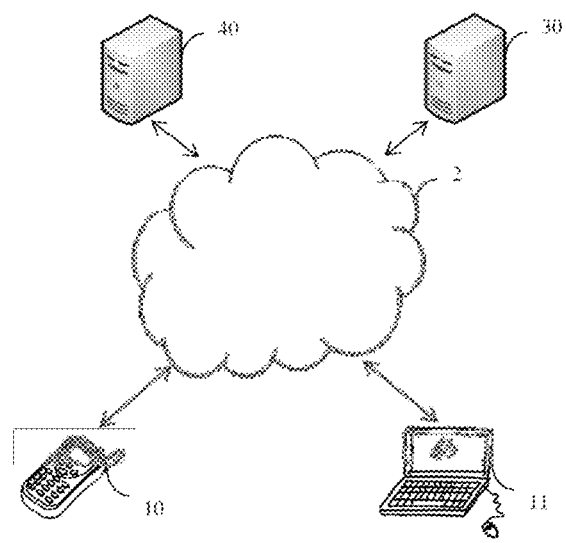
FIG. 1 represents an environment in which the method for connection to a service is implemented in one particular embodiment.

FIG. 1 represents an environment in which the method for connection to a service is implemented in one particular embodiment.

FIG. 1 represents two user devices accessing a service via a communication network 2. One of them 10 is a mobile terminal connected to the communication network 2 via a wireless access network, such as a GSM, UMTS, LTE, etc. mobile network. The second user device 11 is a portable computer connected to the communication network 2 via an access network, for example a wired access network.

The communication network 2 especially allows access to a server 30 implementing a service. The service requests identification of the user. The service is, by way of example, a service accessible on the World Wide Web WWW, commonly called the Web, by means of hypertext interchanges. The Web makes it possible to look, using a browser, at pages accessible on a site, for example hosted on the server 30. The service may also be a mobile service.

A trusted entity 40 is also connected to the communication network 2. In one particular embodiment, the trusted entity 40 is administrated by the operator of the network. The trusted entity 40 is designed to uniquely authenticate a user when he wishes to connect to a service for a set of services implementing the connection technique. One such type of unique authentication is known by the name SSO, for "Single Sign-On", and especially allows simplification, for a user, of connection to his services in a single authentication operation.

The user of the device is recorded at the trusted entity 40. He is identified by a unique user identifier ID_U. This user identifier has an associated:

contact address;

service identifier ID_S for each service.

The user identifier ID_U corresponds, by way of example, to an identifier of a subscription in a mobile network, typically the MSISDN (for "Mobile Station Integrated Services Digital Network Number"). This identifier is the publicly known identification number for the user in the mobile network. It is this identifier, commonly called the telephone number, that needs to be dialed in order to reach the user who has taken out a subscription.

The contact address corresponds to an address to which a response to a request for connection to a service will be sent. In one particular embodiment, it is the identifier of an MSISDN subscription in the mobile network. In another particular embodiment, it is an email address belonging to a user. In the event of fraudulent use of the contact address by a third party, the user can then take action at his network or messaging operator in order to invalidate this contact address. By way of example, when the user device is a mobile terminal, the report made to his operator allows the sending of the response to be blocked if a connection to the service is attempted. The service identifier ID_S corresponds to an identifier under which the user connects to the service. The service identifier may be identical to the user identifier or else to the contact address. There is no limitation attached to the way in which the service identifier is defined.

The response to a request for connection to a service comprises a datum relating to a uniform resource locator associated with this service and a single-use connection code. The datum relating to a uniform resource locator corresponds to a URL (for "Uniform Resource Locator"), coded in the form of a URL scheme. A URL is a character string combining the information necessary for indicating to a piece of software how to access an Internet resource. This information can especially comprise the communication protocol, a user name, a password, an IP address or a domain name, a TCP/IP port number, an access path or a request.

The connection code is unique and generated for the user and for the service by the trusted entity 40. By way of illustrative example, the connection code corresponds to the result of a hash function configured by a secret key associated with the service, which is applied to the user identifier. There is no limitation attached to this illustrative example, the only constraint being that this connection code allows the user and the service to be identified in a certain way. This connection code is a single-use connection code, that is to say that the trusted entity 40 allows only a single connection to the service using this code. In one embodiment, a validity period is associated with the connection code. When the connection code is received after the validity period has expired, connection to the service is not authorized.

Figure 2:
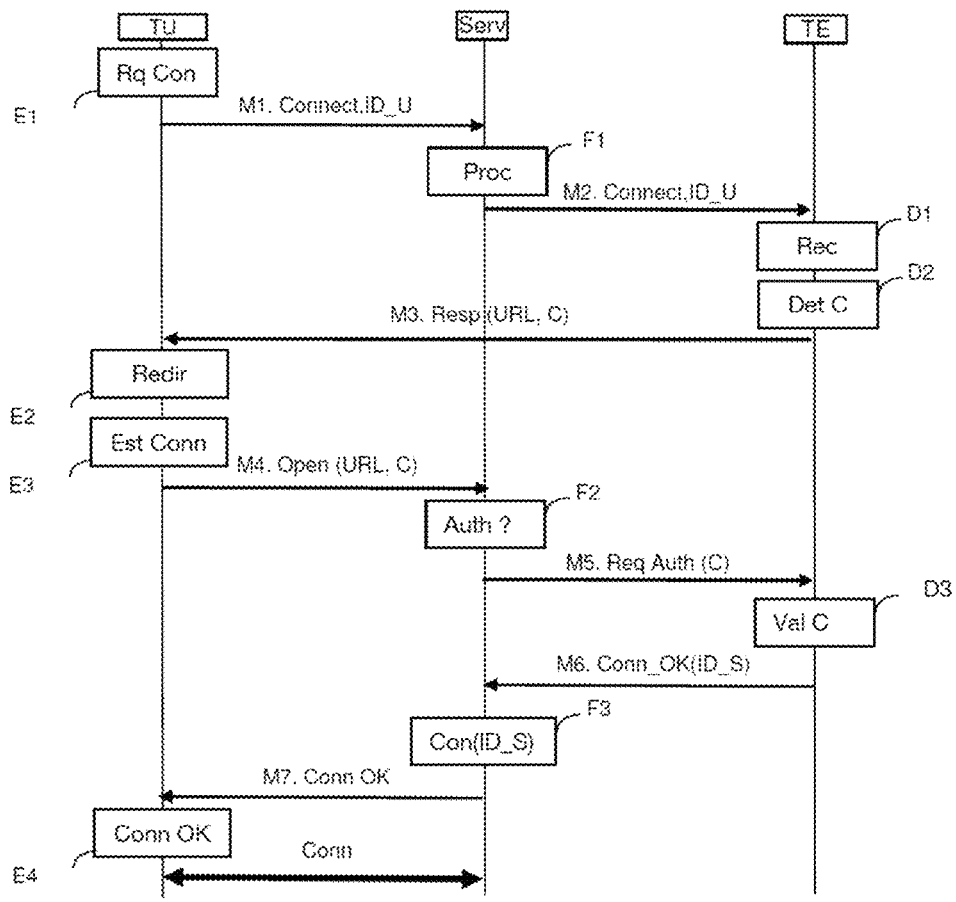
FIGS. 2 and 3 illustrate steps of a method for connection to a service that are implemented by a user device according to particular embodiments.

FIG. 2 illustrates steps of a method for connection to a service that are implemented by a user device 10 (denoted "TU" in FIG. 2) according to a first particular embodiment.

In this first embodiment, the user device is a mobile terminal 10. The user is recorded at the trusted entity 40 (denoted "TE" in FIG. 2) and his user identifier is his MSISDN number. The contact address corresponds to the user identifier.

The user uses a man/machine interface 106 of the user device 10 to request connection to the service provided by the server 30 (denoted "Serv" in FIG. 2). More precisely, this connection request is made via elements of a website or of an application that is displayed on a screen, with which elements the user can interact ("front end" application).

In a sending step E1, the user device 10 sends a connection request M1 to the server 30, hosting the service ("back end" application). The interchanges between the user device 10 and the server 30 are made in accordance with the HTTP (for "Hypertext Transfer Protocol") protocol. A user identifier ID_U of the device 10 at a trusted entity is associated with this request. This identifier ID_U can be provided by the user on each connection request or else can be added automatically by configuration to the connection request. It is recalled that in this particular exemplary embodiment, the identifier ID_U corresponds to the MSISDN number associated with the user.

In a reception step F1, the server 30 receives the message M1 comprising the connection request and the user identifier and retransmits this message M1 to the trusted entity 40 in a message M2.

In a step D1, the trusted entity 40 receives the message M2, more precisely the request for connection to the service from the user device 10 and the user identifier ID_U at the trusted entity 40.

In a step D2, the trusted entity 40 generates a connection code according to the user identifier and the service. This connection code is a single-use connection code, that is to say that it can be presented only a single time by the user in order to connect to the service. Thus, this code cannot be reused or transferred to another user device. In the event of theft or loss of the user device, it is not possible for another user to reuse the connection code in order to connect to the service. The trusted entity 40 stores the associated user identifier and service for the generated connection code. Still in this step D2, the trusted entity 40 accesses the data associated with the user identifier, especially the contact address, and sends the user device 10, at the contact address, a response M3 to the request for connection to the service. It is recalled that in this exemplary embodiment, the contact address corresponds to the user identifier. More precisely, the response comprises a datum relating to a uniform resource locator associated with the service ("Web" link) and the connection code. Said response is transmitted in the form of an SMS (for "Short Message Service") short message sent to the contact address, that is to say the MSISDN number. This short message invites the user to click on the datum relating to a uniform locator.

The response is received by the user device 10 in a step E2.

The action performed by the user, that is to say pressing (or clicking) on the datum using the man/machine interface 106, triggers sending, by the user device 10, in a step E3, of an access request M4 for access to a page of the service, the address of which corresponds to the datum, hosted on the server 30. The connection code received in step E2 is associated, by the user device 10, with the access request M4.

The access request M4 is received by the server 30 in a step F2. Still in this step F2, the server 30 sends the trusted entity 40 a service identifier request M5 comprising the connection code received from the user device 10, in order to check that the user is indeed authorized to access the service and in order to obtain the service identifier for this user.

This service identifier request M5 is received by the trusted entity 40 in a step D3. Still in this step D3, the trusted entity 40 checks that the received connection code is valid, that is to say that it has not already been received, and obtains the user identifier ID_U and the service that are associated with the connection code and thus the service identifier ID_S associated with the user identifier at the trusted entity.

When the connection code is valid, the trusted entity 40 transmits to the server 30 an authorization for connection to the service M6 for the service identifier. When the connection code is not valid, the trusted entity 40 transmits to the server 30 a connection denial. The user of the device is then informed thereof.

The next consideration is the case of a connection authorization. The authorization for connection to the service M6 is received in a step F3 by the server 30, which in turn transmits a connection confirmation M7 to the user device 10. The user device 10 is then connected (step E4) to the service for the service identifier ID_S associated with the user identifier ID_U at the trusted entity 40. The connection remains active for as long as the user does not disconnect the user device 10 from the service. Once disconnected, in order to connect again, as the connection code is a single-use connection code, the various steps described above are implemented once again.

It is thus found that, from the point of view of the user, the route for connecting to the service is very simple to implement. It suffices for him to send a request for connection to the service, without a password, and then to click on a link that redirects him to a page of the service (website or mobile application). The connection code then allows him to be connected.

Thus, the user does not have to remember a password for each service. Access is effected by means of a user device authenticated by his network operator. There is no ambiguity about the identity of the user. The user device thus plays the part of a secure element and provides security for the connection method.

When the trusted entity is itself administrated by the operator at which the user has taken out his subscription, the user has the guarantee that it is no longer possible to connect to the service once the loss or theft of his user device has been reported to the operator. The reason is that the operator can immediately update the trusted entity in order to block a connection using the corresponding user identifier.

This particular embodiment has been described for a user identifier and a contact address that are identical, the MSISDN number of the user. There is no limitation attached to this particular embodiment. The user identifier can correspond to an alias defined by the user, to an electronic mail address associated with the user, etc.

In one particular embodiment, a validity period is associated with the connection code generated in step D2. In step D3, when the validity of the code is checked, the trusted entity 40 checks that the code is still valid, that is to say that the validity period has not expired. This makes it possible to supervise the actual connection of the user device and to improve the security of the connection method further.

Figure 3:
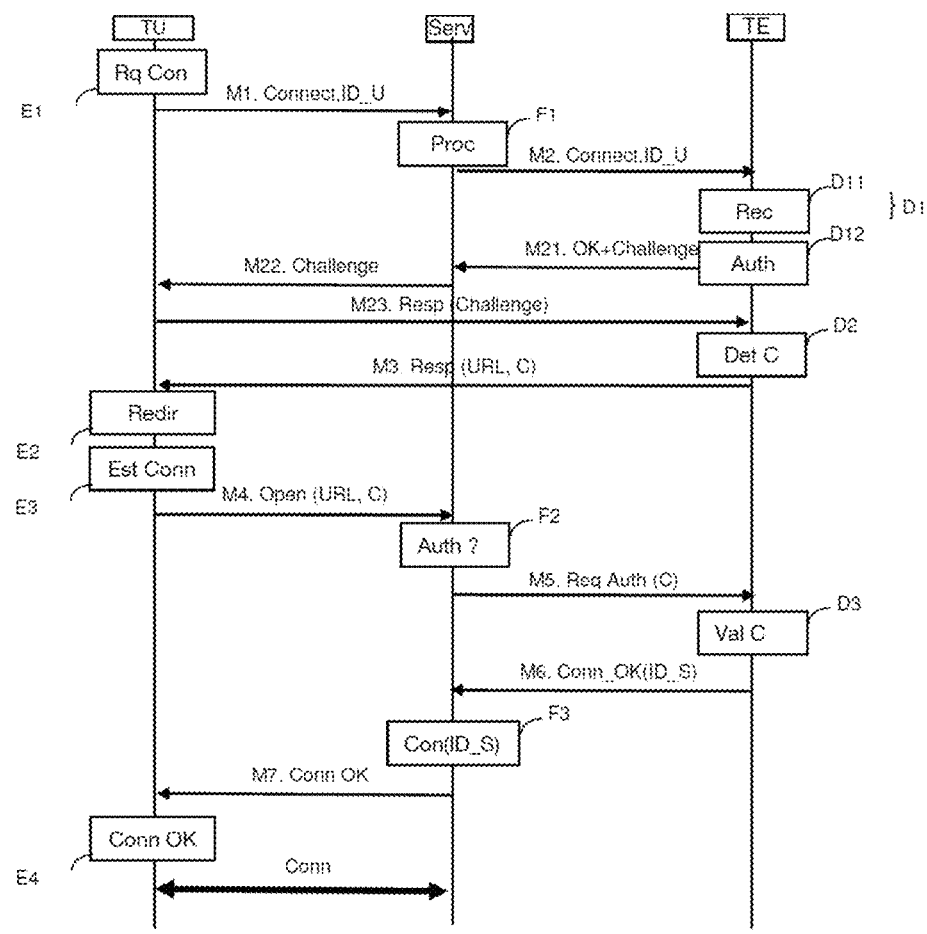

FIG. 3 illustrates steps of a method for connection to a service that are implemented by a user device 11 (denoted "TU" in FIG. 3) according to a second particular embodiment.

In this second embodiment, the user device is a portable computer 11. The user is recorded at the trusted entity 40 (denoted "TE" in FIG. 3) and his user identifier is his MSISDN number. The contact address corresponds to an electronic mail address of the user.

The user uses the user device 11 to request a connection to the service provided by the server 30 (denoted "Serv" in FIG. 3). More precisely, this connection request is made via elements of a website that is displayed on a screen, with which elements the user can interact ("front end" application). The interchanges between the user device 11 and the server 30 take place according to the HTTP protocol.

In a sending step E1, the user device 11 sends a connection request M1 to the server 30, hosting the service ("back end" application). A user identifier ID_U of the device 11 at a trusted entity is associated with this request. This identifier ID_U can be provided by the user on each connection request or else can be added automatically by configuration to the connection request. It is recalled that, in this particular exemplary embodiment, the identifier ID_U corresponds to the MSISDN number associated with the user.

In a reception step F1, the server 30 receives the message M1 comprising the connection request and the user identifier and retransmits this message M1 in a message M2 to the trusted entity 40.

The trusted entity 40 receives, in a substep D11 of a step D1, the message M2, more precisely the request for connection to the service from the user device 11 and the user identifier ID_U at the trusted entity.

In a substep D12 of step D1, using a message M21, the trusted entity 40 confirms reception of the connection request message and transmits a challenge to the server 30 intended for the user device 11. The challenge corresponds to a random key and comprises a datum relating to a uniform resource locator associated with the trusted entity 40 (or URL of the trusted entity).

The server 30 transmits to the user device 11 a message M22 comprising the challenge. The user device 11 is redirected to the trusted entity 40 and sends a message M23 comprising the challenge in response. These interchanges take place transparently for the user.

In a step D2, the trusted entity 40 receives the authentication response M23 and, when this authentication is positive, generates a single-use connection code according to the user identifier and the service. The trusted entity 40 stores the associated user identifier and service for the generated connection code. Still in this step D2, the trusted entity 40 accesses the data associated with the user identifier, especially the contact address, and sends the user device 11, at the contact address, a response M3 to the request for connection to the service. It is recalled that, in this exemplary embodiment, the contact address corresponds to an email address of the user. More precisely, the response comprises a datum relating to a uniform resource locator associated with the service ("web" link) and the connection code. Said response is transmitted in the form of an electronic mail sent to the contact address, that is to say an email address of the user. This electronic mail invites the user to click on the datum relating to a uniform locator.

The response is received by the user device 11 in a step E2.

The action taken by the user, that is to say using the man/machine interface to press on the datum, triggers, in a step E3, sending, by the user device 11, of an access request M4 for accessing a page of the service whose address corresponds to the datum, hosted on the server 30. The connection code received in step E2 is associated with the access request M4 by the user device 11.

The access request M4 is received by the server 30 in a step F2. Still in this step F2, the server 30 sends the trusted entity 40 a service identifier request M5 comprising the connection code received from the user device 11, in order to check that the user is indeed authorized to access the service and in order to obtain the service identifier for this user.

This service identifier request M5 is received by the trusted entity 40 in a step D3. Still in this step D3, the trusted entity 40 checks that the received connection code is valid, that is to say that it has not already been received, and determines the user identifier associated with the connection code and thus the service identifier ID_S associated with the user identifier ID_U at the trusted entity. When the connection code is valid, the trusted entity 40 transmits to the server 30 an authorization for connection to the service for the service identifier. When the connection code is not valid, the trusted entity 40 transmits a connection denial to the server 30.

We now consider the case of a connection authorization. This is received in a step F3 by the server 30, which in turn transmits a connection confirmation M7 to the user device 10. The user device 11 is then connected (step E4) to the service for the service identifier ID_S associated with the user identifier ID_U at the trusted entity 40. The connection remains active for as long as the user does not disconnect the user device 11 from the service. Once disconnected, as the connection code is a single-use connection code, the various steps described above are implemented again.

It is thus found that, from the point of view of the user, as well as for the first embodiment, the route for connecting to the service is very simple to implement. It suffices for him to send a request for connection to the service, without a password, and then to click on a link to a page of the service. The user does not have to remember a password for each service. The user device is related to the trusted entity in order to provide security for the connection method.

As described for the first embodiment, a validity period can be defined for the generated connection code.

Thus, the connection method makes it possible to simplify the connection to a service by requesting solely a contact address, mobile telephone number or electronic mail. No password is requested.

Figure 4:
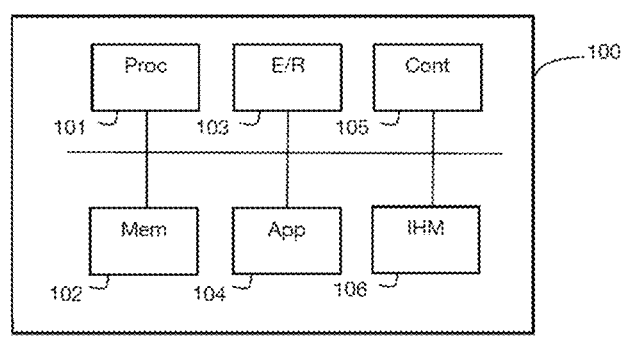
FIG. 4 represents a user device according to a particular embodiment.

FIG. 4 represents a user device 100 in one particular embodiment. The user device 100 especially comprises:
- a memory area 102, designed to store an application that comprises code instructions for implementing the steps of the connection method;
- a storage memory, not represented, designed to store data used when the connection method is implemented;
- a processor 101 for executing code instructions of software modules;
- an interface module 103 for interfacing with a communication network, designed to transmit and receive data;
- a connection module 104 for connection to a service;
- a contact module 105, designed to receive from a trusted entity a response to a request for connection to a service, the response comprising a datum relating to a uniform resource locator associated with said service and a single-use connection code;
- a man/machine interface module 106, designed to interact with a user.

The connection module 104 is especially designed to:
- send a request for connection to a service 30, an identifier of a user of the device at a trusted entity 40 being associated with said request;
- following reception of the response by the contact module 105, send a request for access to a page of the service whose address corresponds to the data included in the response, the connection code received in the response being associated with said access request;
- connect to the service for a service identifier associated with the user identifier at the trusted entity, following validation of the connection code by the trusted entity.

In one particular embodiment, the response is sent to a contact address associated with the user identifier at the trusted entity and the contact module 105 is designed to receive a response sent to this contact address.

The contact module 105 corresponds, in one particular embodiment, to a module for sending and receiving short messages. In another embodiment, the contact module 105 corresponds to a module for sending and receiving electronic mail.

It is emphasized here that the user device 100 also comprises other processing modules, not represented in FIG. 4, designed to implement the various user device functions.

Figure 5:
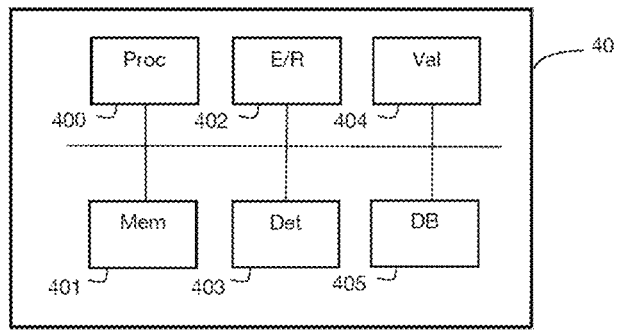
FIG. 5 represents a trusted entity according to a particular embodiment.

FIG. 5 represents a trusted entity 40 in one particular embodiment. The trusted entity 40 is designed to authorize connection of a user device 10, 11 to a service 30 and especially comprises:
- a memory area 401, designed to store an application that comprises code instructions for implementing the steps of the connection method;
- a storage memory, not represented, designed to store data used when the connection method is implemented;
- a processor 400 for executing code instructions of software modules;
- an interface module 402 for interfacing with a communication network, designed to transmit and receive data;
- a database 405, designed to store, for a user identifier, one or more service identifiers for one or more services;
- a determination module 403, designed to determine a response to a request for connection to a service, an identifier of a user of a user device at the trusted entity being associated with said request, said response comprising a datum relating to a uniform resource locator associated with said service and a single-use connection code;
- a connection authorization module 404, designed to authorize a connection to said service for a service identifier for said service, associated with the user identifier, when a connection code received from the server implementing the service, in association with a service identifier request, is valid, and otherwise to reject the connection.

The determination module 403 is especially designed to generate a connection code for the user identifier and the service.

In one particular embodiment, the determination module 403 is designed to send the response to a contact address associated with the user identifier at the trusted entity.

It is emphasized here that the trusted entity 40 also comprises other processing modules, not represented in FIG. 5, designed to implement the various trusted entity functions.

There is no limitation attached to these various embodiments and a person skilled in the art is able to define others by redirecting the user device to a page of the service, for which page the connection is authorized according to the validity of a connection code.

The connection technique is implemented by means of software and/or hardware components. With this in mind, the term "module" can correspond in this document either to a software component or to a hardware component, or to a set of hardware and/or software components, which is capable of implementing a function or a set of functions, according to what is described above for the module in question.

A software component corresponds to one or more computer programs, one or more subroutines of a program or, more generally, to any element of a program or of a piece of software. Such a software component is stored in memory and then loaded and executed by a data processor of a physical entity and is capable of accessing the hardware resources of this physical entity (memories, recording media, communication buses, electronic input/output cards, user interfaces, etc.).

In the same way, a hardware component corresponds to any element of a hardware assembly. It may be a programmable or nonprogrammable hardware component, with or without an integrated processor for executing software. It is, by way of example, an integrated circuit, a chipcard, an electronic card for executing a piece of firmware, etc.

In one particular embodiment, the modules 104, 105 are designed to implement the connection method described above. They are preferably software modules comprising software instructions for executing those of the steps of the connection method described above that are implemented by a user device. The invention therefore also concerns:
- a program for a user device, comprising program code instructions intended to control the execution of the steps of the connection method described above when said program is executed by this user device;
- a recording medium readable by a user device, on which the program for a device is recorded.

In one particular embodiment, the modules 403, 404 are designed to implement the connection method described above. They are preferably software modules comprising software instructions for executing those of the steps of the connection method described above that are implemented by a trusted entity. The invention therefore also concerns:
- a program for a trusted entity, comprising program code instructions intended to control the execution of the steps of the connection method described above when said program is executed by this trusted entity;
- a recording medium readable by a trusted entity, on which the program for an entity is recorded.

The software modules can be stored in or transmitted by a data medium. This may be a hardware storage medium, for example a CD-ROM, a magnetic floppy disk or a hard disk, or else a transmission medium such as an electrical, optical or radio signal, or a telecommunication network.

An exemplary embodiment of the present disclosure aims to overcome shortcomings/disadvantages of the prior art and/or to make improvements thereto.

Although the present disclosure has been described with reference to one or more examples, workers skilled in the art will recognize that changes may be made in form and detail without departing from the scope of the disclosure and/or the appended claims.

The invention claimed is:

1. A connection method for connection to a service of a user device, said method comprising:
- recording a user at a trusted entity, wherein a contact address and a service identifier, under which the user connects to the service, are associated with a user identifier and stored in association by the trusted entity;
- after recording, sending a request for connection to said service from the device to a server hosting said service, wherein said user identifier using the device is associated with said request;
- receiving, by said device, from the trusted entity, a response to said request, said response comprising a datum relating to a uniform resource locator associated with said service and a single-use connection code and being sent to the contact address associated with the user identifier recorded at the trusted entity, said connection code being generated by the trusted entity, and the user identifier and a parameter designating the service being stored in association with said connection code;
- sending, by said device, of a request for access to a page of the service whose address corresponds to said datum, said page being hosted on the server, the received connection code being associated with said access request;
- connecting the user device to the server hosting said service for the service identifier associated with the user identifier at the trusted entity, following validation of the connection code by the trusted entity and transmission by the trusted entity to the server of an authorization for connection to the service for the service identifier, the connection code enabling the trusted entity to obtain the user identifier and the service that are associated with said connection code and the service identifier associated with the user identifier recorded at the trusted entity; and
- receiving a denial for connection to said service, following invalidation of the connection code by the trusted entity and transmission by the trusted entity to the server of a denial for connection to the service, when said connection code was previously used in association with another access request.

2. The connection method as claimed in claim 1, in which the contact address is a telephone number allowing the user of the device to be reached.

3. The connection method as claimed in claim 1, in which the contact address is an electronic mail address associated with the user of the device.

4. A method for connection to a service of a user device, said method comprising:
- recording a user at a trusted entity, wherein a contact address and a service identifier, under which the user connects to the service, are associated with a user identifier and stored in association by the trusted entity;
- after recording, receiving, by a trusted entity a request for connection to said service from the device, wherein said user identifier using the device is associated with said request;
- generating, by the trusted entity, a single-use connection code and storing the user identifier and a parameter designating the service in association with said connection code;
- sending, to the device, by the trusted entity, a response to said request, said response comprising a datum relating to a uniform resource locator associated with said service and said connection code and being sent to the contact address associated with the user identifier recorded at the trusted entity;
- transmitting from the trusted entity to a server implementing said service an authorization for connection to the service for the service identifier;
- authorizing connection to the server implementing said service for the service identifier associated with the user identifier recorded at the trusted entity, when a connection code received, by the trusted entity, from the server, in association with a service identifier request, is valid, the connection code enabling the trusted entity to obtain the user identifier and the service that are associated with said connection code and the service identifier associated with the user identifier recorded at the trusted entity; and
- denying connection to said service, following invalidation of the connection code by the trusted entity when said connection code was previously used in association with another access request.

5. A user device comprising:
- a processor; and
- a non-transitory computer-readable medium comprising instructions stored thereon, which when executed by the processor configure the user device to perform acts comprising:
- recording a user at a trusted entity, wherein a contact address and a service identifier, under which the user connects to the service, are associated with a user identifier and stored in association by the trusted entity;
- after recording, sending a request for connection to a service to a server hosing said service, wherein said user identifier using the device is associated with said request;

receiving, from the trusted entity, a response to the request for connection to the service, the response comprising a datum relating to a uniform resource locator associated with said service and a single-use connection code and being sent to the contact address associated with the user identifier recorded at the trusted entity, said connection code being generated by the trusted entity, and the user identifier and a parameter designating the service being stored in association with said connection code;

following reception of the response, sending a request for access to a page of the service whose address corresponds to the datum included in the response, said page being hosted on the server, the connection code received in the response being associated with said access request;

connecting to the server hosting said service for the service identifier associated with the user identifier at the trusted entity, following validation of the connection code by the trusted entity and transmission by the trusted entity to the server of an authorization for connection to the service for the service identifier, the connection code enabling the trusted entity to obtain the user identifier and the service that are associated with said connection code and the service identifier associated with the user identifier recorded at the trusted entity; and receiving a denial for connection to said service, following invalidation of the connection code by the trusted entity and transmission by the trusted entity to the server of a denial for connection to the service, when said connection code was previously used in association with another access request.

6. A trusted entity, designed to authorize connection of a user device to a service, said trusted entity comprising:
a processor; and
a non-transitory computer-readable medium comprising instructions stored thereon, which when executed by the processor configure the trusted entity to perform acts comprising:
recording a user at a trusted entity, wherein a contact address and a service identifier, under which the user connects to the service, are associated with a user identifier and stored in association by the trusted entity;
after recording, receiving a request for connection to said service from the device, wherein said user identifier using the device is associated with said request;
generating, by the trusted entity, a single-use connection code and storing the user identifier and a parameter designating the service in association with said connection code;
sending, to the device, by the trusted entity, a response to said request, said response comprising a datum relating to a uniform resource locator associated with said service and said connection code and being sent to the contact address associated with the user identifier recorded at the trusted entity;
transmitting from the trusted entity to a server implementing said service an authorization for connection to the service for the service identifier;
authorizing connection to the server implementing said service for the service identifier associated with the user identifier recorded at the trusted entity, when a connection code received, by the trusted entity, from the server, in association with a service identifier request, is valid, the connection code enabling the trusted entity to obtain the user identifier and the service that are associated with said connection code and the service identifier associated with the user identifier recorded at the trusted entity; and denying connection to said service, following invalidation of the connection code by the trusted entity when said connection code was previously used in association with another access request.

7. A non-transitory computer-readable recording medium comprising program code instructions stored thereon to control execution a method for connection to a service of a user device, when said instructions are executed by a processor of the user device, said method comprising:
recording a user at a trusted entity, wherein a contact address and a service identifier, under which the user connects to the service, are associated with a user identifier and stored in association by the trusted entity;
after recording, sending a request for connection to said service from the device to a server hosing said service, wherein said user identifier using the device is associated with said request;
receiving, by said device, from the trusted entity, a response to said request, said response comprising a datum relating to a uniform resource locator associated with said service and a single-use connection code and being sent to the contact address associated with the user identifier recorded at the trusted entity, said connection code being generated by the trusted entity and the user identifier and a parameter designating the service being stored in association with said connection code;
sending, by said device, of a request for access to a page of the service whose address corresponds to said datum, said page being hosted on the server, the received connection code being associated with said access request;
connecting to the server hosting said service for the service identifier associated with the user identifier at the trusted entity, following validation of the connection code by the trusted entity and transmission by the trusted entity to the server of an authorization for connection to the service for the service identifier, the connection code enabling the trusted entity to obtain the user identifier and the service that are associated with said connection code and the service identifier associated with the user identifier recorded at the trusted entity; and
receiving a denial for connection to said service, following invalidation of the connection code by the trusted entity and transmission by the trusted entity to the server of a denial for connection to the service, when said connection code was previously used in association with another access request.

8. A non-transitory computer-readable recording medium comprising program code instructions to control execution of a method for connection to a service of a user device, when the instructions are executed by a processor of a trusted entity, said method comprising:
recording a user at a trusted entity, wherein a contact address and a service identifier, under which the user connects to the service are associated with a user identifier and stored in association by the trusted entity;
after recording, receiving, by the trusted entity a request for connection to said service from the device, wherein said user identifier using the device is associated with said request;

generating, by the trusted entity, a single-use connection code and storing the user identifier and a parameter designating the service in association with said connection code;

sending, to the device, by the trusted entity, a response to said request, said response comprising a datum relating to a uniform resource locator associated with said service and said connection code and being sent to the contact address associated with the user identifier recorded at the trusted entity;

transmitting from the trusted entity to a server implementing said service an authorization for connection to the service for the service identifier:

authorizing connection to the server implementing said service for the service identifier associated with the user identifier recorded at the trusted entity, when a connection code received, by the trusted entity, from the server, in association with a service identifier request, is valid, the connection code enabling the trusted entity to obtain the user identifier and the service that are associated with said connection code and the service identifier associated with the user identifier recorded at the trusted entity; and denying connection to said service, following invalidation of the connection code by the trusted entity when said connection code was previously used in association with another access request.

\* \* \* \* \*